No. 866,602. PATENTED SEPT. 17, 1907.
C. A. RUMBLE.
AIR TREATING MACHINE.
APPLICATION FILED MAY 13, 1907.

2 SHEETS—SHEET 1.

Witnesses
Raphael G. Blanc
Blanche L. Gilbride

Inventor
Charles A. Rumble
By Henry J. Miller
Atty.

No. 866,602. PATENTED SEPT. 17, 1907.
C. A. RUMBLE.
AIR TREATING MACHINE.
APPLICATION FILED MAY 13, 1907.

2 SHEETS—SHEET 2.

Witnesses.
Raphael G. Blanc
Blanche L. Gilbride

Inventor.
Charles A. Rumble
By Henry J. Miller
atty.

UNITED STATES PATENT OFFICE.

CHARLES A. RUMBLE, OF BOSTON, MASSACHUSETTS, ASSIGNOR TO BIBBER MANUFACTURING COMPANY, OF BOSTON, MASSACHUSETTS, A CORPORATION OF WEST VIRGINIA.

AIR-TREATING MACHINE.

No. 866,602.  Specification of Letters Patent.  Patented Sept. 17, 1907.

Application filed May 13, 1907. Serial No. 373,489.

*To all whom it may concern:*

Be it known that I, CHARLES A. RUMBLE, of Boston, in the county of Suffolk and State of Massachusetts, have invented certain new and useful Improvements in Air-Treating Machines; and I hereby declare that the following is a full, clear, and exact description of the same, reference being had to the accompanying drawings, forming part of this specification.

This invention relates to improvements in machines, whereby air passing through said machines may be supplied with moisture.

One object of the invention is to improve the construction of the means for sustaining the moisture.

Another object of the invention is to improve the construction of machines of this nature with respect to the water tank which forms a drip receptacle, and in the means for driving the air drawing fan shaft.

Other objects of the invention will appear from the following description.

Figure 1:
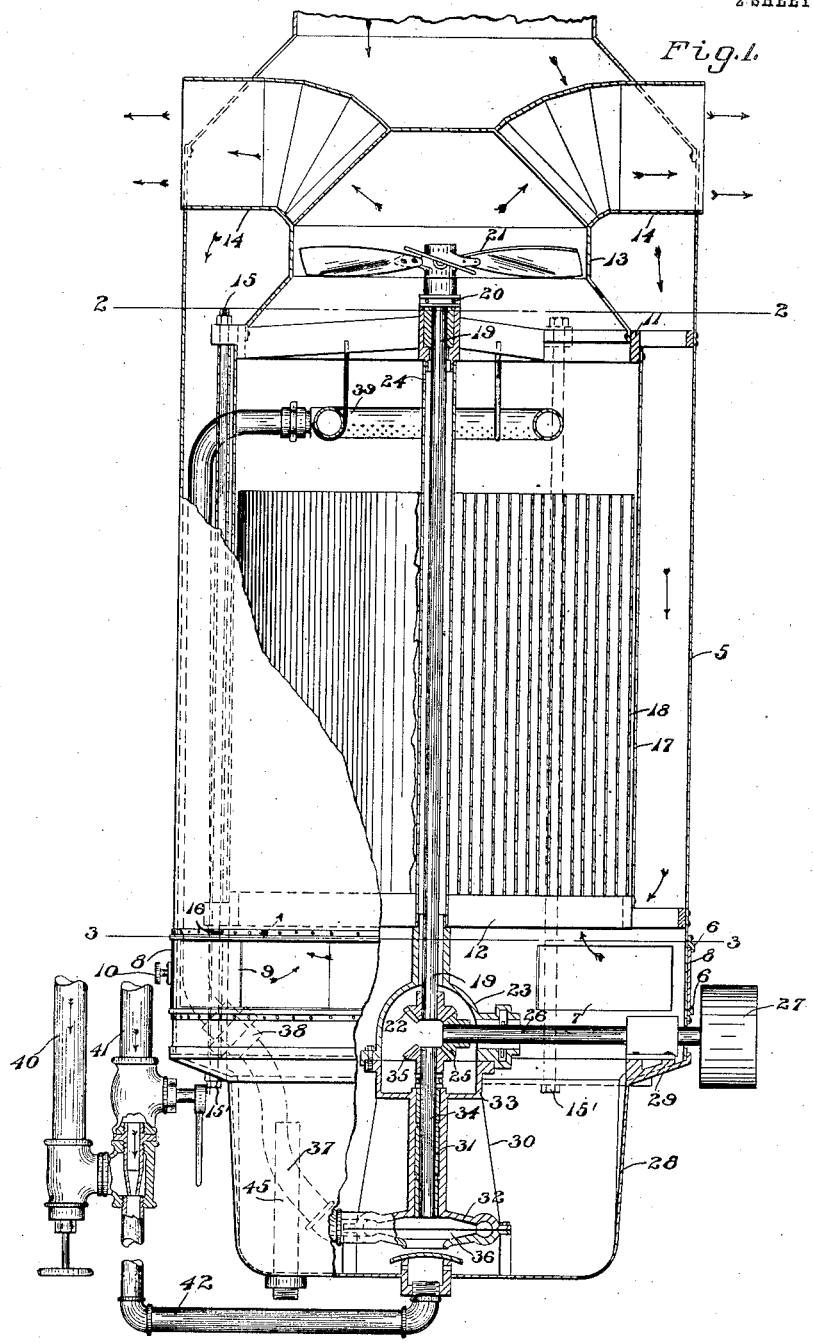
Figure 2:
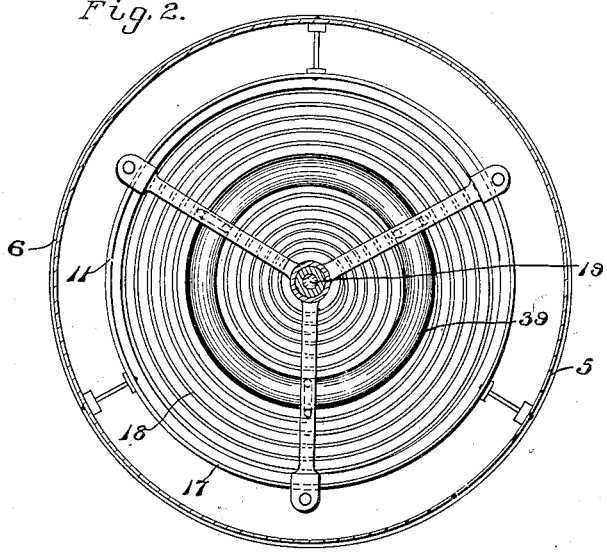
Figure 3:
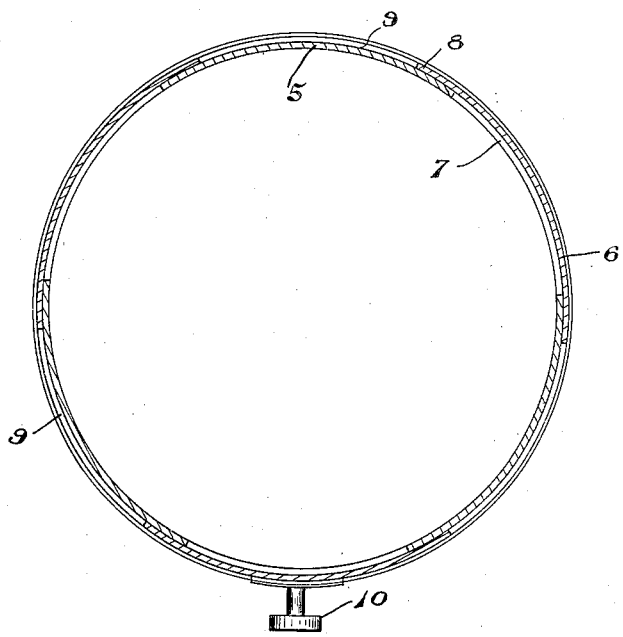

Figure 1, represents a front view of the improved machine shown partially in section. Fig. 2, represents a section taken on line 2—2 Fig. 1, looking downward. Fig. 3, represents a similar view taken on line 3—3 Fig. 1.

Similar numbers of reference designate corresponding parts throughout.

As shown in the drawings, in its preferred form, the machine comprises a cylindrical casing 5 having at its lower end the annular guides 6—6 and the openings 7—7 between said guides and furnished with the ring 8 having the opening 9—9 and knob 10, which ring is free to slide in the guides 6—6 of the casing 5, whereby the ring 8 may be rotated, about said casing, to bring the openings 9—9 opposite those marked 7—7, to admit air to the machine, when desired or to bring parts of said ring 8 over said openings 7—7 to close said openings when it is desired to draw air from the upper part of the machine. The upper portion of the casing has an air inlet pipe connected with any, preferably exterior, air supply.

Within the casing 5 are mounted the frames 11 and 12, secured to the casing, and on the frame 11 is mounted the fan chamber 13 having the outlets 14—14 which extend through openings in the wall of the casing 5. From the frame 11 extends a series of bolts 15—15, nuts 16—16 on which, assist in supporting the frame 12, the casing 17 and the spirally wound sheet metal moisture delivery plate 18.

Journaled in a bearing in the frame 11 is the fan shaft 19, which is supported on the ball bearing 20 and is furnished at its upper end with the fan 21 and at its lower end with the bevel gear 22 which is protected by the gear casing 23 from which the tube 24 extends upward to the frame 11. The gear 22 is driven from the bevel gear 25 mounted on the shaft 26 which is journaled in bearings carried respectively by the gear casing 23 and by the water tank, the outer end of said shaft having the pulley 27 which may be driven in any usual manner.

On the lower ends of the bolts, or rods, 15—15 and secured thereon by the nuts 15'—15', is mounted the tank 28 having the annular flange 29 which receives the lower end of the casing 5. In the center of this tank is the pedestal 30 having the tubular bearing 31, the pump casing 32 and the gear casing 33 which latter is designed to be secured to the casing 23. Within the bearing 31 is journaled the shaft 34 having at its upper end the bevel gear 35, meshing with the gear 25, and at its lower end the rotary pump 36 within the casing 32. The pump casing 32 is connected by the pipe 37, having the union 38, with the sprayer 39 suspended from the frame 11, above the moisture distributer 18, and of any usual form designed to deliver water, supplied thereto, in finely divided streams, or in spray, to the upper end of the spiral sheet 18. Water, or steam, or both simultaneously are delivered to the center of the tank 28 through the pipes 40—41 and 42 and waste from said tank may pass through the overflow pipe 45.

The shape of the moisture distributing plate 18 will be understood by reference to Fig. 2 of the drawings from which it will appear that said plate is wound upon itself and that the spaces between the convolutions are spiral in cross section. By this construction the moisture supporting element can be economically constructed and its several convolutions are accurately spaced.

With the ring moved to a position to close the openings 7—7 in the casing 5, and with a supply of water, or water mixed with steam, in the tank 28, the pulley 27 is driven and the pump is operated to draw water from the tank and force the same to the sprayer 39 from whence it is delivered in fine streams, or spray, to the upper end of the spiral sheet 18; at the same time the fan 21 is driven and draws the air from the lower portion of the casing 5 up through the casing 17, this supply of air being continually renewed by air passing into the casing 5 through the inlet at the upper end of said casing 5. As the air passes upward between the wet surfaces of the plate 18 a large proportion of the moisture on said surfaces is absorbed by the air and, as the air passes in a vortex, through the spray delivered by the sprayer 39, additional moisture is taken up by the air which is finally expelled from the machine through the outlets 14—14.

When it is desired to draw air from the room in which the machine is located the ring 8 is moved around the casing 5, to bring the openings 7—7 of said casing, whereupon the flow of air is through said openings directly into the lower end of the inner casing 17 and thence upward between the wet surfaces of the spiral plate 18.

It is to be noted that the tank 28 is readily removable from the casing 5 as the securing means for the gear cases and other inner parts are accessible through the opening 7—7 of said casing 5 and the nuts 15'—15' of the supporting bolts 15—15 are outside said casing.

Having thus described my invention I claim as new and desire to secure by Letters Patent.

1. An air treating machine comprising an exterior casing having an air inlet at the top, an inner casing having air outlets at its upper portion, a moisture distributing element located within said inner casing, means for supplying water to the upper end of said element, a fan rotatably mounted above said element, and means for rotating said fan.

2. An air treating machine comprising an exterior casing having an air inlet at the top, an inner casing, having air outlets at its upper portion, a moisture distributing element within said inner casing, means for supporting said inner casing and said element, consisting of a series of bolts, and a tank secured to the lower ends of said bolts, and having a flange which closes the lower end of the exterior casing.

3. An air treating machine comprising an exterior casing having an inlet at its top and a series of inlets near its lower end, means for closing said latter inlets, an inner casing having air outlets at its upper end, a water distributing element within said inner casing, bolts for sustaining said element, a tank secured to the lower portions of said bolts, a rotary pump located within said tank, a spraying device located above the distributing element, a pipe connecting said spraying device with said pump, a fan rotatably mounted at the upper portion of the inner casing and having a shaft extending downward therefrom, and means for simultaneously driving the pump and the fan shaft as described.

In testimony whereof I affix my signature in presence of two witnesses.

CHARLES A. RUMBLE.

Witnesses:
H. J. MILLER.
B. L. GILBRIDE.